(12) United States Patent  (10) Patent No.: US 7,743,788 B2
Schmitt et al.  (45) Date of Patent: Jun. 29, 2010

(54) FAUCET ASSEMBLY WITH WATER QUALITY INDICATOR

(75) Inventors: Craig A. Schmitt, Phoenix, AZ (US); Mark Henss, Glendale, AZ (US); Shannon Murphy, Anthem, AZ (US)

(73) Assignee: Watts Regulator Co., North Andover, MA (US)

( * ) Notice: Subject to any disclaimer, the term of this patent is extended or adjusted under 35 U.S.C. 154(b) by 1045 days.

(21) Appl. No.: 11/455,399

(22) Filed: Jun. 19, 2006

(65) Prior Publication Data

US 2006/0289343 A1 Dec. 28, 2006

Related U.S. Application Data

(60) Provisional application No. 60/693,862, filed on Jun. 17, 2005.

(51) Int. Cl.
*B01D 35/143* (2006.01)
(52) U.S. Cl. .................. 137/554; 137/801; 210/91; 210/96.2
(58) Field of Classification Search ............. 137/801, 137/553–554; 210/91, 85, 93, 96.1, 96.2, 210/138
See application file for complete search history.

(56) References Cited

U.S. PATENT DOCUMENTS

| | | | |
|---|---|---|---|
| 4,623,451 A | 11/1986 | Oliver | |
| 4,856,121 A | 8/1989 | Traylor | |
| 4,885,081 A | 12/1989 | Oliver | |
| 4,918,426 A | 4/1990 | Butts et al. | |
| 4,937,557 A | 6/1990 | Tucci et al. | |
| 5,050,772 A | 9/1991 | Brane et al. | |
| 5,065,901 A | 11/1991 | Brane et al. | |
| 5,089,144 A * | 2/1992 | Ozkahyaoglu et al. | ...... 210/767 |
| 5,236,578 A | 8/1993 | Oleskow et al. | |
| 5,388,287 A | 2/1995 | Tischler et al. | |
| 5,435,909 A | 7/1995 | Burrows | |
| 5,580,444 A | 12/1996 | Burrows | |
| 5,622,618 A | 4/1997 | Brane et al. | |
| 6,484,751 B2 * | 11/2002 | Lafler et al. | ................. 137/554 |
| 6,517,707 B2 | 2/2003 | Giordano et al. | |
| 7,017,600 B2 | 3/2006 | Klein | |

\* cited by examiner

*Primary Examiner*—Terry K Cecil
(74) *Attorney, Agent, or Firm*—Fish & Richardson P.C.

(57) ABSTRACT

A faucet assembly including a base defining a water delivery passageway, a valve member received in the base and movable between a closed position wherein flow through the water delivery passageway is blocked and an opened position wherein flow through the water delivery passageway is permitted, a magnet secured to the valve member such that, when the valve member is rotated to the opened position, the magnet is aligned with a sensor bore of the base, and when the valve member is rotated to the closed position, the magnet is unaligned with the sensor bore, a metal rod positioned in the sensor bore, and a Hall effect sensor positioned below the base in alignment with the sensor bore and adapted to switch on when the magnet is aligned with the sensor bore and switch off when the magnet is unaligned with the sensor bore.

11 Claims, 9 Drawing Sheets

FAUCET ASSEMBLY WITH WATER QUALITY INDICATOR

CROSS-REFERENCE TO RELATED APPLICATIONS

The present application claims priority from provisional U.S. Patent Application Ser. No. 60/693,862, filed Jun. 17, 2005, which is incorporated herein by reference in its entirety.

TECHNICAL FIELD OF THE DISCLOSURE

The present disclosure relates to faucet assemblies and, more particularly, to a faucet assembly having a water quality indicator for use with a reverse osmosis water filtering system.

BACKGROUND OF THE DISCLOSURE

In addition to the hot and cold water faucets normally provided on a typical household countertop sink, an auxiliary faucet may be provided for an auxiliary water supply such as water hot enough for making coffee or tea, refrigerated water, or tap water which has been further processed to remove impurities and foreign tastes. A reverse osmosis (RO) tap water filtering system, for example, normally is provided with its own faucet for installation through the counter top, next to the sink.

As is known, an RO filtering process uses a semi-permeable membrane that has the ability to remove and reject a wide spectrum of impurities and contaminants from water using only typical household water pressure. This semi permeable membrane will effectively take out total dissolved solids (TDS), sodium, and heavy metals, as well as cysts, such as Giardia and cryptosporidium. These contaminants are automatically rinsed down the drain or injected into the hot water supply line (which normally is not used for drinking). The purified water is then stored in a tank for dispensing through the auxiliary faucet.

FIG. 9 shows a typical RO water filtering system 10 constructed in accordance with the prior art. The system 10 includes a filter assembly 14, a reverse osmosis membrane 18, a reverse osmosis storage tank 22, a flow restrictor 26, a shut-off valve 28, a carbon filter 70 and an auxiliary faucet 72. The faucet 72 includes a base 79. The filter assembly 14 includes a sediment filter 30 and carbon filters 34a, 34b. Intake water enters the system 10 from a cold-water angle stop valve 36, which is connected to a cold-water source 84, and is routed through an intake tube 38 to filter system 14. The cold-water angle stop valve 36 is also connected to a standard faucet 62 through a cold-water faucet line 64 providing cold water to the standard faucet. A hot-water angle stop valve 56 connects a hot-water source 82 through a hot-water faucet line 76 to the standard faucet 62.

The sediment filter 30 removes sediment such as sand and dirt and the like from the intake water, while the carbon filters 34a and 34b remove chlorine and other contaminants that cause bad color, odor and taste. The filtered water is then routed to the membrane 18 through a water tube 40. These filters normally have to be replaced after a certain period of time or after a certain amount of usage, whichever comes first.

The RO membrane 18 includes three ports: an intake port 42, a permeate outlet port 46, and a concentrate outlet port 50. The intake port 42 receives filtered intake water from the filter assembly 14 through the water tube 40. The permeate water is routed from outlet port 46 through permeate tubes 52a and 52b and shut-off valve 28 to tank 22 to be stored under pressure. The shut-off valve 28 is automatic and stops the flow of water to the membrane 18 and to the tank 22 when the tank is full. When the auxiliary faucet 72 is opened by a user, permeate water is forced from the tank 22, through a carbon filter 70, and though the faucet 72. Concentrate water is routed from the outlet port 50 through a wastewater tube 78, having a flow restrictor 26, through a drain tube 74 for subsequent disposal down drain 68. In a "zero-waste" system, the concentrate water is injected into the hot water supply 82 (which normally is not used for drinking).

A TDS monitor is to measure the Total Dissolved Solids in drinking water in order to check the effectiveness of the RO membrane. A properly operating membrane will reduce between 75% and 99% of dissolved solids depending on water conditions and temperature. When the membrane is not operating properly it needs to be replaced. Membranes have a life expectancy of between 2 and 5 years, depending on the incoming water conditions and the amount of use of the RO system.

What is still desired is a new and improved faucet assembly. Among other advantages and benefits, the new and improved faucet assembly will preferably include a water quality indicator for indicating when filters should be replaced.

SUMMARY OF THE DISCLOSURE

The present disclosure provides a new and improved faucet assembly including a water quality indicator. The water quality indicator provides an indication that at least one filter used with the faucet is in need of replacement. According to one aspect, the water quality indicator includes a replaceable battery that is mounted in a drawer that can be pulled out from a base of the faucet so that the battery can be changed without removing or disassembling the faucet.

According to another aspect, the water quality indicator detects operation of a handle of the faucet via a magnetic signal such that no possible water leakage points are provided between the water quality indicator and water passages of the faucet assembly. In one embodiment, the water quality indicator includes a Hall effect sensor, a magnet located on the handle of the faucet assembly, and a medal rod extending between the handle and the Hall effect sensor for transmitting a magnetic signal between the magnet and the Hall effect sensor when the handle is moved to the opened position.

The water quality indicator further includes a microprocessor connected to the Hall effect sensor and light emitting diodes (LEDs) connected to the microprocessor. In one embodiment, the microprocessor is programmed to execute an elapsed time/usage function such that, when the handle is moved to the opened position, the microprocessor flashes one of the LEDs depending upon whether six months have passed since the filter was changed, or a maximum number of gallons has been cleaned by the filter (as estimated by the amount of time the faucet handle has been in the open position). This sensor is for use with a sediment filter or a carbon filter.

According to an additional aspect, the water quality indicator is for use with a reverse osmosis (RO) tap water filtering system and includes a total dissolved solids (TDS) sensor function. The water quality indicator includes a microprocessor connected to a first sensor inserted into an inlet of a RO membrane of the RO system and a second sensor inserted into a permeate water outlet of the RO membrane. The microprocessor is programmed to compare the electrical resistance of the water going in and the water going out of the RO membrane and to calculate a ratio to get a percent TDS reduction. When the ratio is more than a predetermined set point, the microprocessor is programmed to flash a first LED to indicate that the RO membrane is working properly, and when the ratio is less than the set point the microprocessor is programmed to flash a second LED to indicate that the RO membrane needs replacement.

According to a further aspect, the water quality indicator includes a total dissolved solids (TDS) sensor function for use with a RO membrane and an elapsed time/usage function for use with a sediment filter or a carbon filter. In this embodiment, the first and the second LEDs will flash successively to indicate that the RO membrane needs replacement, and only one of the LEDs will flash to indicate that the filters needs replacement.

The present disclosure also provides a reverse osmosis (RO) tap water filtering system including a faucet assembly constructed in accordance with the present invention. The RO system includes a RO membrane having a permeate water output port connected to the faucet assembly for dispensing the permeate water.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

Reference is made to the attached drawings, wherein elements having the same reference character designations represent like elements throughout, and wherein.

DETAILED DESCRIPTION OF EXEMPLARY EMBODIMENTS

Figure 9:
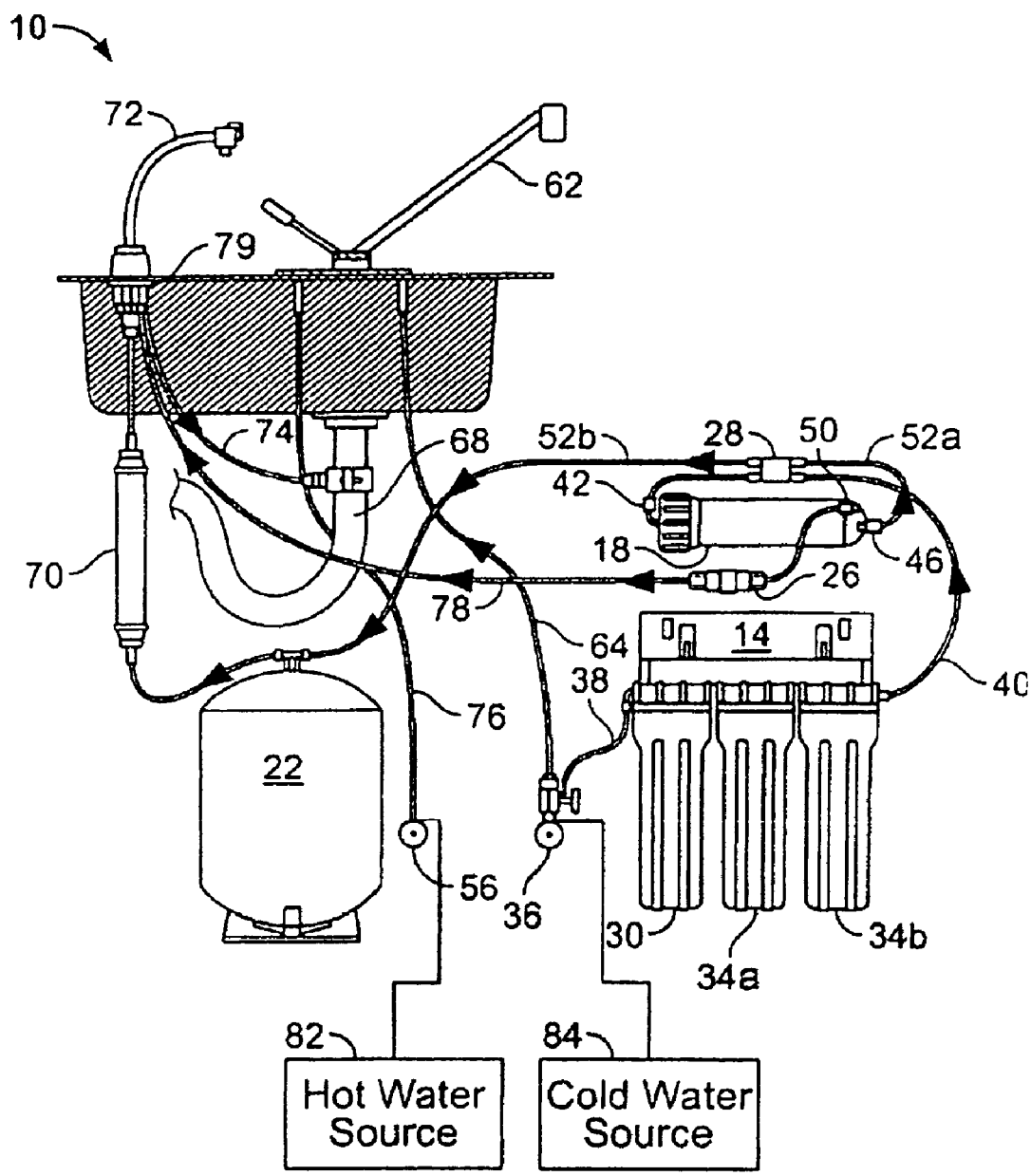
FIG. 9 shows an exemplary embodiment of a reverse osmosis water filtering system constructed in accordance with the prior art.

The present disclosure provides an exemplary embodiment of an auxiliary faucet assembly 100 for use with a tap water filtering system. A reverse osmosis (RO) tap water filtering system, for example, normally is provided with its own faucet for installation through the counter top, next to the sink. The presently disclosed auxiliary faucet assembly 100 is for use as part of an RO filtering system, such as the prior art system 10 shown in FIG. 9. Among other aspects and advantages, the faucet assembly 100 includes a water quality indicator 200 that provides an indication of when the sediment filters, the carbon filters, and the RO membrane of the RO filtering system need to be replaced.

Figure 1:
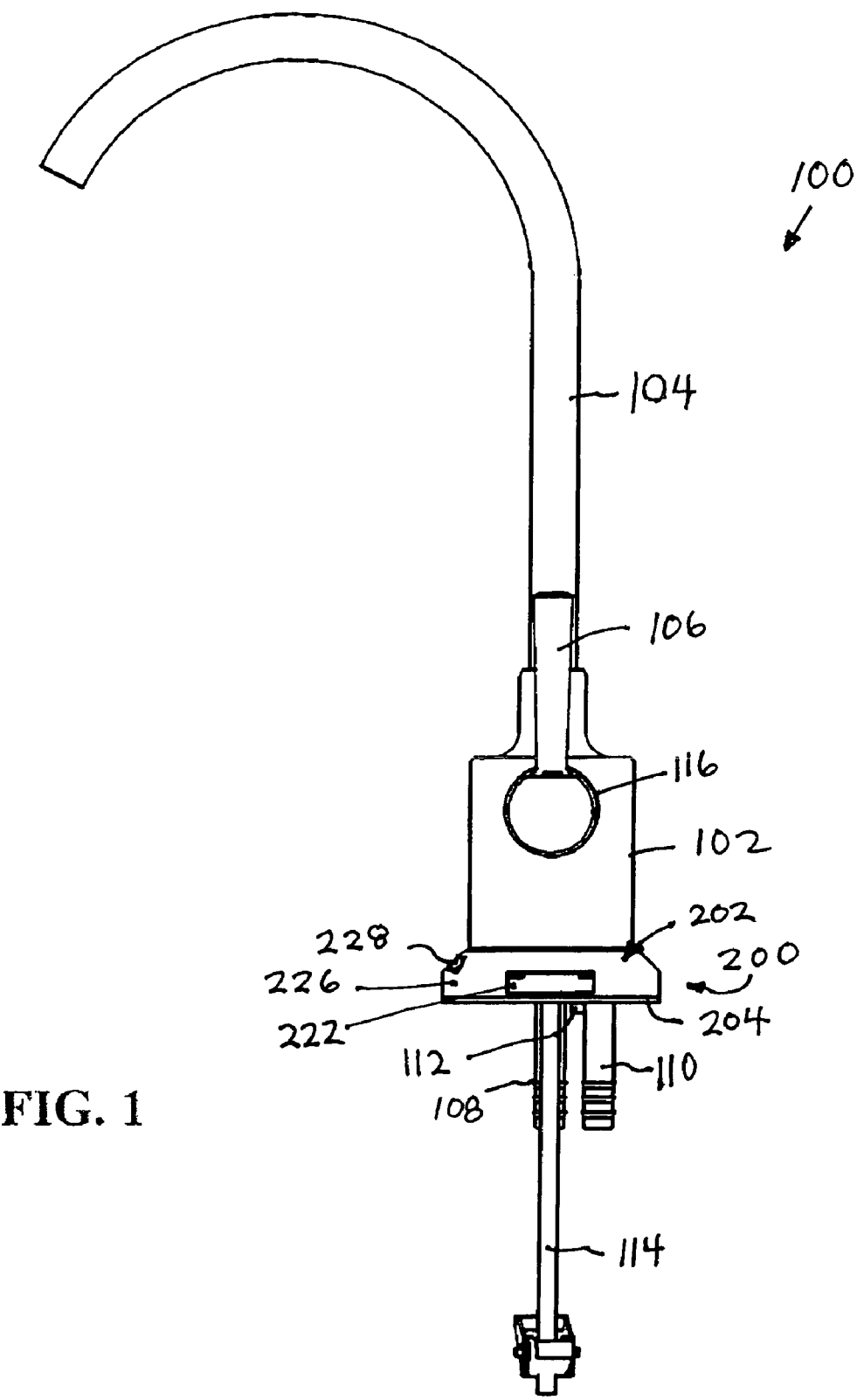
FIG. 1 is an elevation view from a first side of an exemplary embodiment of a faucet assembly constructed in accordance with the present disclosure.
Figure 2:
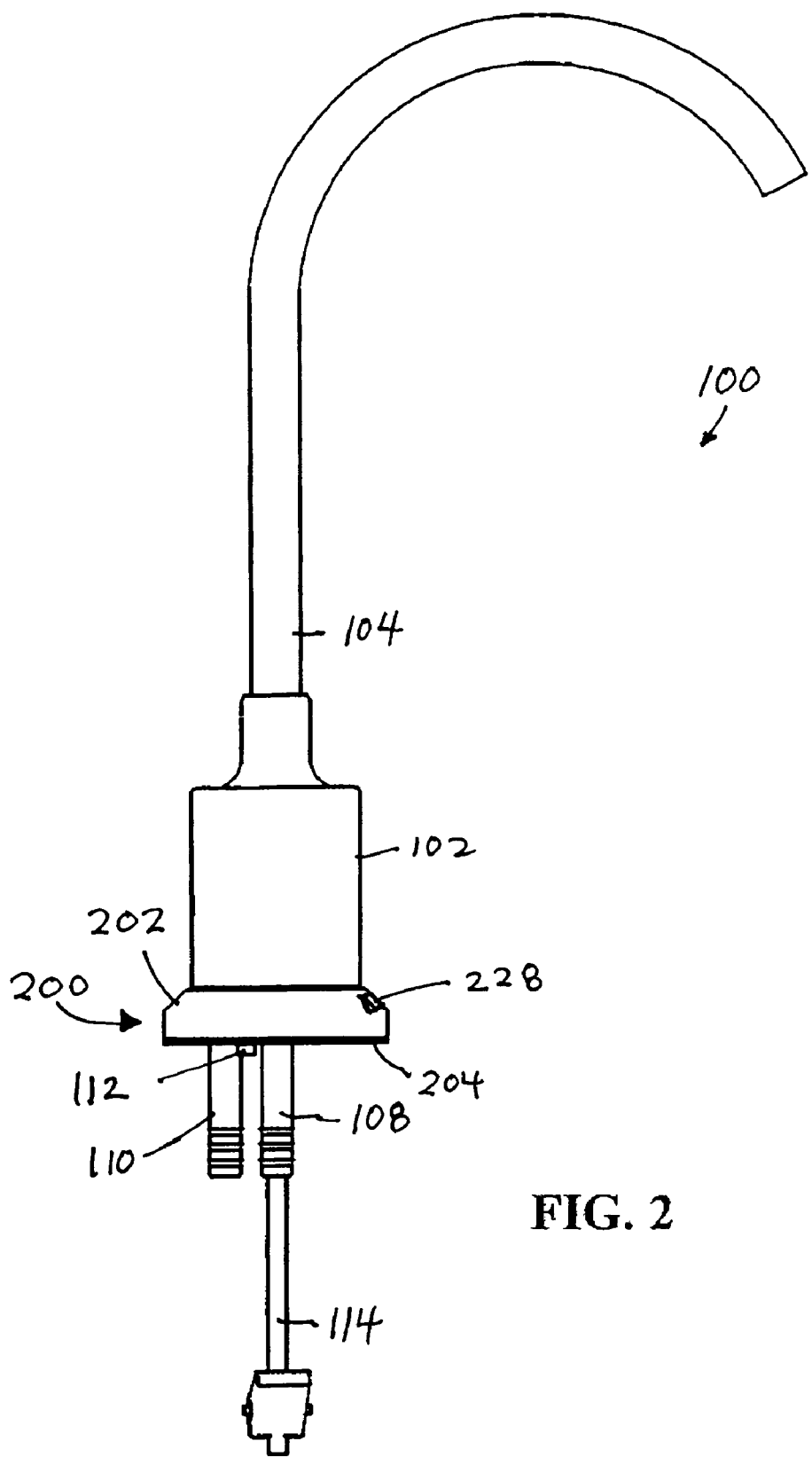
FIG. 2 is an elevation view from a second side, opposite the first side, of the faucet assembly of FIG. 1.
Figure 3:
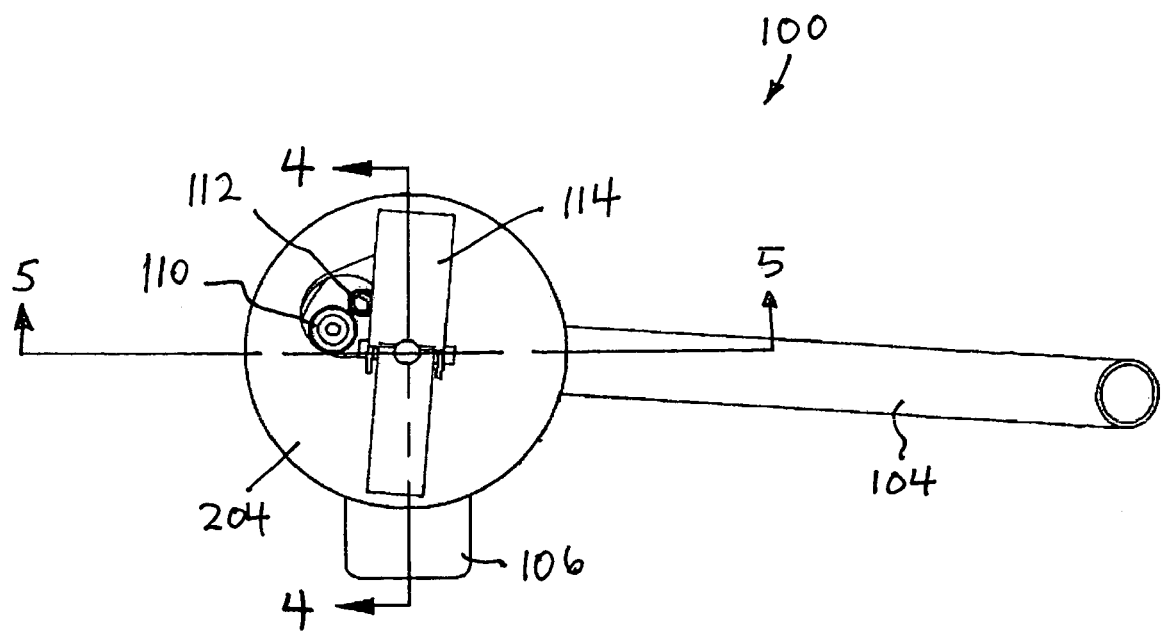
FIG. 3 is a bottom plan view of the faucet assembly of FIG. 1.

Referring first to FIGS. 1-3, the faucet assembly 100 generally includes a base 102, a spout 104 extending from a top end of the base, and a handle 106 for controlling water flow through the faucet assembly. Connecting tubes extend from a bottom of the base and include a permeate water inlet tube 108, a concentrate water inlet tube 110, and a wastewater outlet tube 112. In the exemplary embodiment shown, the faucet assembly 100 also includes a toggle bolt 114 for securing the assembly to a counter-top. It should be understood, however, that the presently disclosed water quality indicator 200 can be used on a faucet that does not include a toggle bolt 114 mounting system, and that does not include a concentrate water inlet tube 110, and a wastewater outlet tube 112.

Figure 4:
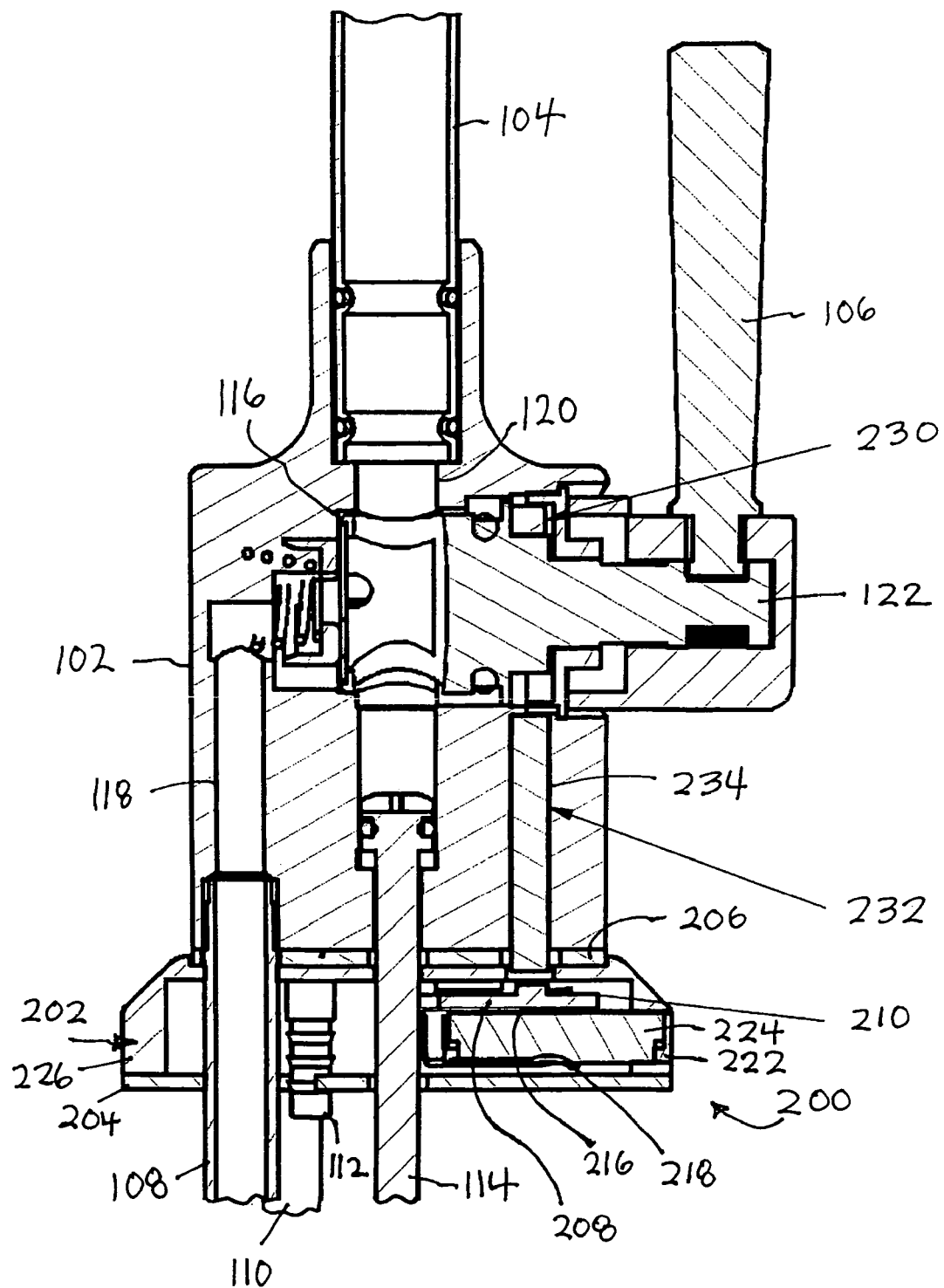
FIG. 4 is an enlarged sectional view of a portion of the faucet assembly taken along line 4-4 of FIG. 3.

Referring to the sectional view of FIG. 4, the base 102 defines a valve assembly bore 116 connecting a permeate water inlet port 118 to a spout port 120 to form a water delivery passageway. A valve member 122 is positioned within the valve assembly bore 116 for rotation about a longitudinal axis extending between a first end received in the water delivery passageway and a second end extending out of the base 102. The valve member 122 is adapted to be rotated between a closed position wherein flow through the water delivery passageway is blocked and an opened position wherein flow through the water delivery passageway is permitted. As shown, the handle 106 is secured to the second end of the valve member 122. The permeate water tube 108 is secured in the permeate water inlet port 118 and fluid communication is provided between the permeate water inlet port 118 and the spout port 120 when the valve member 122 is moved to the opened position.

Figure 5:
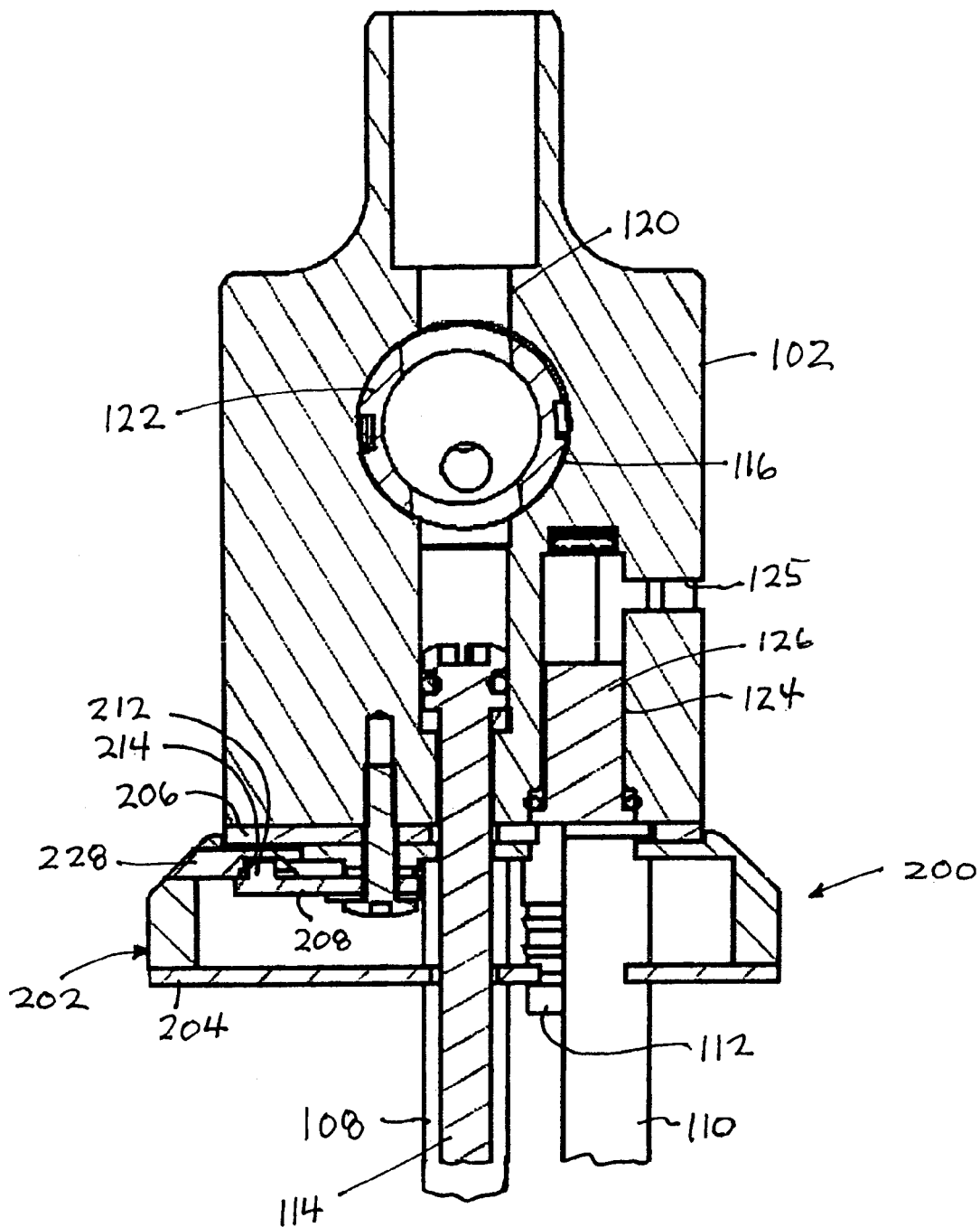
FIG. 5 is an enlarged sectional view of a portion of the faucet assembly taken along line 5-5 of FIG. 3.
Figure 6:
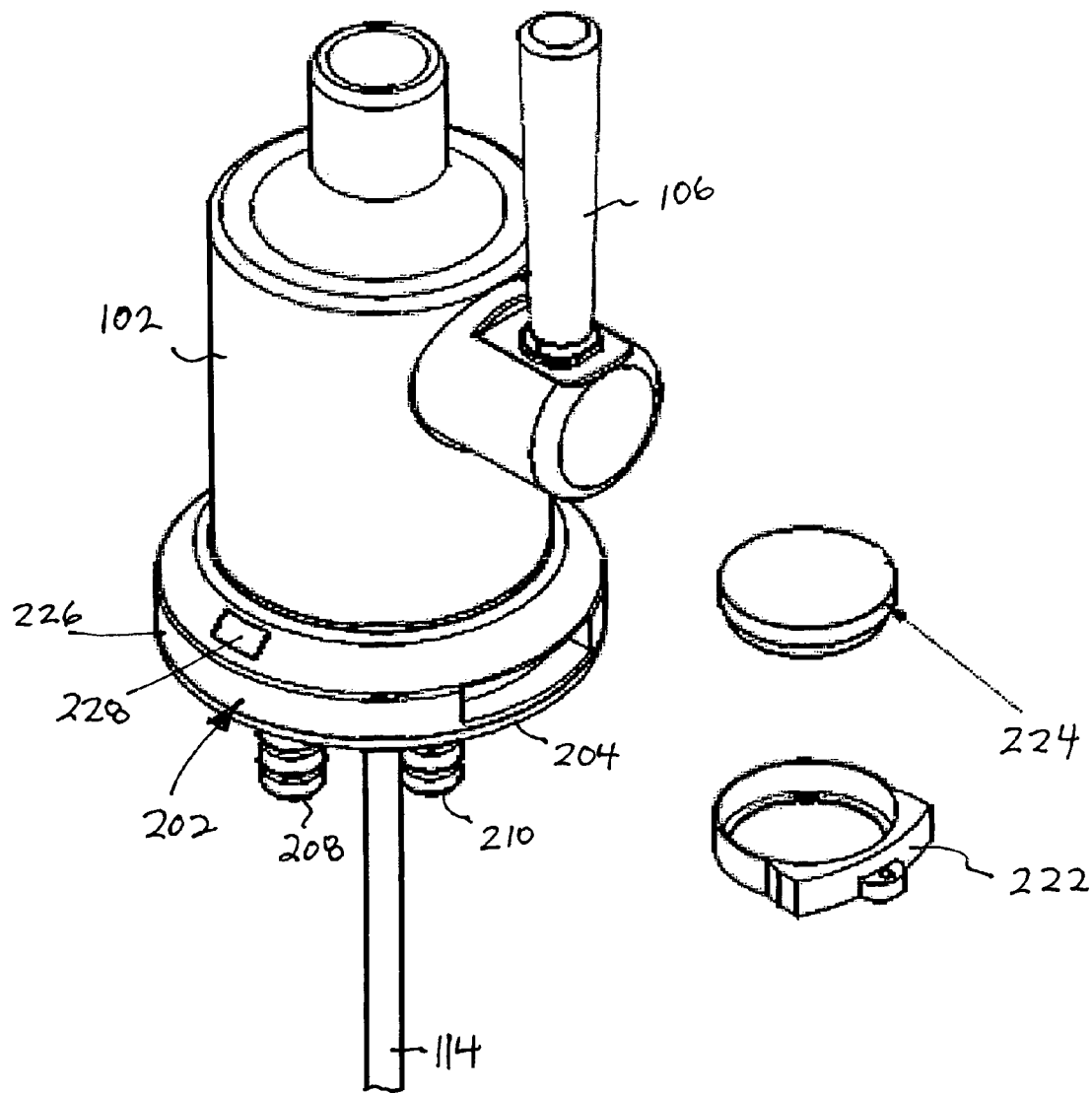
FIG. 6 is an enlarged perspective view of a portion of the faucet assembly of FIG. 1, wherein a battery and a battery drawer are shown removed from a sensor housing of the faucet assembly.
Figure 7:
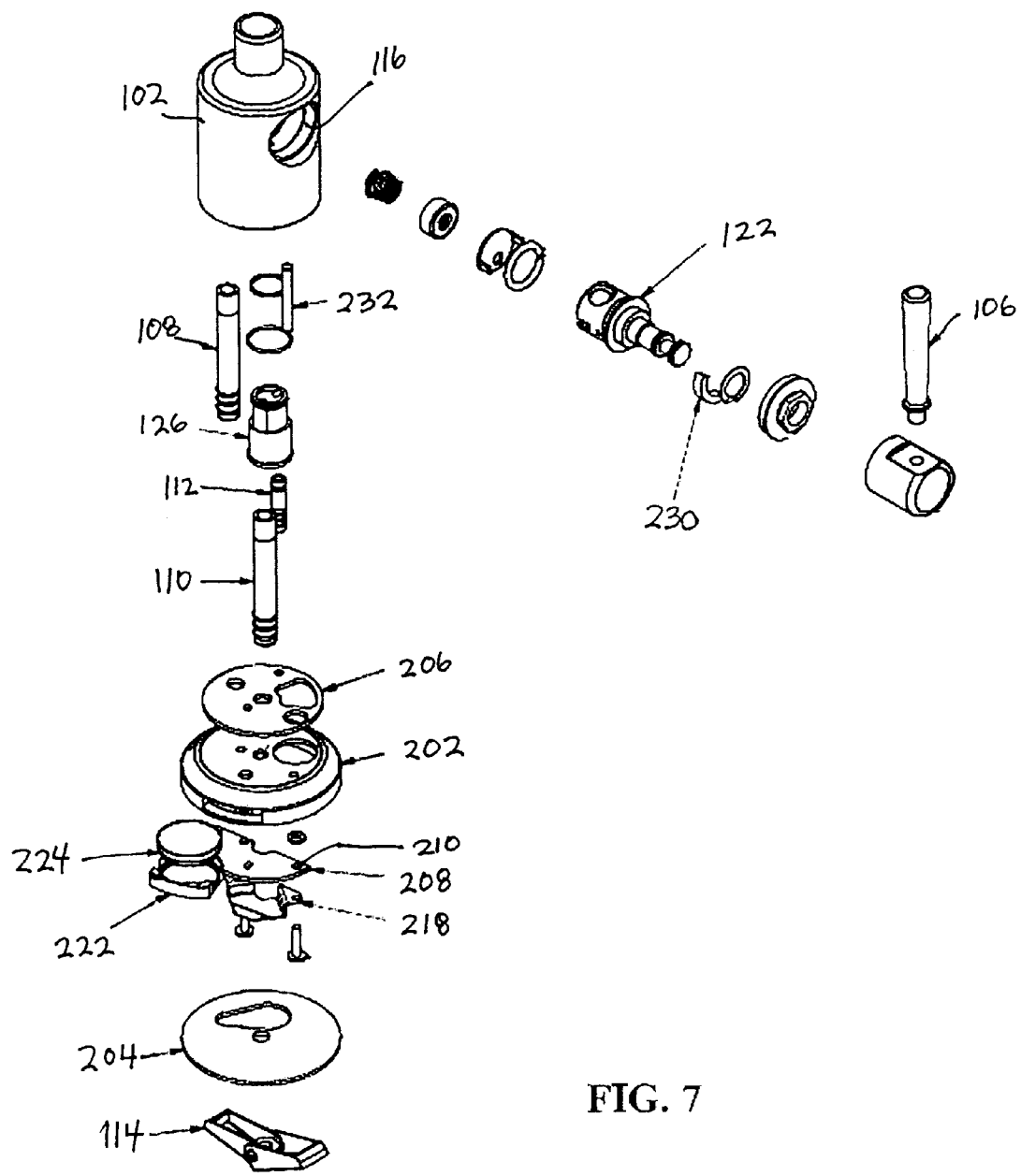
FIG. 7 is an exploded perspective view of a portion of the faucet assembly of FIG. 1.
Figure 8:
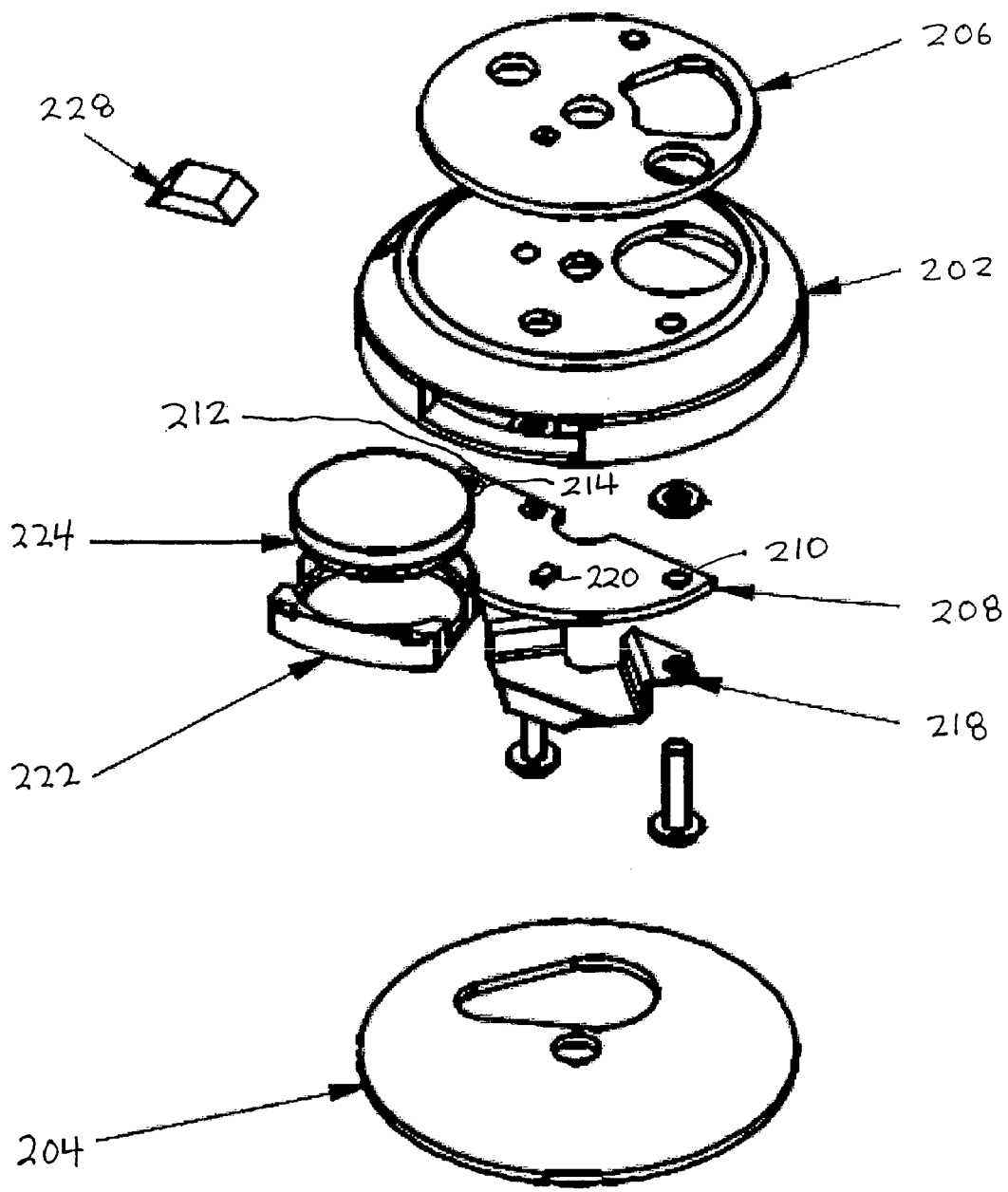
FIG. 8 is an enlarged, exploded perspective view of a portion of the faucet assembly of FIG. 1.

As shown the sectional view of FIG. 5, the base 102 also has an air gap bore 124 extending from the bottom end, and an air gap port 125 extending from a sidewall of the base 102 to the air gap bore. An air gap holder 126 is received in the air gap bore 124 and the concentrate water inlet tube 110 and the wastewater outlet tube 112 are received in the air gap holder. In operation, concentrate water from the concentrate water inlet tube 110 is directed to a top of the air gap bore 124 above the air gap port 125 and then allowed to flow down to the waste water outlet tube 112 located below the air gap bore. During backflow operation (when there is a blockage in connected drain pipes, for example), wastewater from the wastewater outlet tube 112 is directed out the air gap port 125 and out of the faucet assembly 100 and is prevented from going back to the concentrate water inlet tube 112.

Referring now to FIGS. 1-2 and 4-8, the water quality indicator 200 includes a housing 202 assembled to the bottom end of the base 102 of the faucet assembly 100. Although shown as two separate pieces that are assembled together, in another exemplary embodiment the housing 202 could be unitarily formed as part of the base 102. A lower gasket 204 is provided between the housing 202 and a surface of a counter-top that the faucet assembly 100 is mounted on, while an upper gasket 206 is provided between the housing 202 and the base 102. The gaskets protect the interior of the housing 202 from water. The water quality indicator 200 also includes a printed circuit board (PCB) 208 secured within the housing 202. The PCB 208 has mounted on a top surface thereof a Hall effect sensor 210 and first and second different colored light emitting diodes (LEDs) 212, 214. The first and the second LEDs might, for example, comprise a green LED 212 and a red LED 214. A battery contact 216 and a battery clip 218 are mounted on a bottom surface of the PCB 208 208. A processor 220 is also mounted on the PCB 208 and operatively connected to the Hall effect sensor 210, the LEDs 212, 214, the battery contact 216 and the battery clip 218. The various components can be mounted in any order and position on the PCB 208 as appropriate.

The water quality indicator 200 further includes a battery drawer 222 that receives and holds a replaceable battery 224 and that can be slid in and out of an opening in a sidewall 226 of the housing 202 for replacement of the battery 224. The PCB 208 and the battery drawer 222 are arranged and adapted such that, when the drawer 222 and the battery 224 are inserted into the housing 202, a top surface of the battery 224 contacts the battery contact 216 of the PCB 208 while a bottom surface of the battery contacts the battery clip 218 (see FIG. 4). The housing 202 also includes a window that receives an LED light tube 228, which in turn is mounted over the LEDs 212, 214 of the PCB 208.

The water quality indicator 200 additionally includes a magnet 230 secured to the valve member 122 of the faucet assembly 100, and a metal rod 232 that extends between the Hall effect sensor 210 of the PCB 208, through a sensor bore 234 in the base 102 of the faucet assembly 100 (shown in FIG. 4), to the valve member 122. The metal rod 232 acts as a conduit for magnetic flux from the magnet 230 secured to the valve member 122. The Hall effect sensor 210 is a transducer that varies its output voltage in response to changes in magnetic field density. In the exemplary embodiment shown, the Hall effect sensor 210 is used for proximity switching and is combined with circuitry that allows the device to act in a digital (on/off) mode. The magnet 230 is secured to the valve member 122 such that, when the valve member 122 is moved to its opened position, the magnet 230 is aligned with the metal rod 232, and the Hall effect sensor 210 is switched on.

The processor 220 is programmed to execute an elapsed time/usage function for use with a sediment filter or a carbon filter, which includes summing a filter usage time equal to time that the valve member 122 is in the opened position (i.e., when the Hall effect sensor 210 is switched on). The processor 220 is further programmed to activate the first LED 212 when the valve member 122 is moved to the opened position and the filter usage time is less than a predetermined usage limit (e.g., 10 hours of usage), and activate the second LED 214 when the valve member 122 is moved to the opened position and the filter usage time is equal to or greater than the predetermined usage limit indicate that the filters need replacement.

The elapsed time/usage function also includes the processor 220 summing filter installment time equal to overall time since filter replacement, and activating the first LED 212 when the valve member 122 is moved to the opened position and the filter installment time is less than a predetermined filter life limit (e.g., six months) or activating the second LED 214 when the valve member 122 is moved to the opened position and the filter installment time is equal to or greater than the predetermined filter life limit to indicate that the filters need replacement. The battery 224 is also replaced when the filters are replaced such that the filter installment time is reset to zero when the filters are replaced.

According to an additional aspect, the water quality indicator 200 is for use with a reverse osmosis (RO) tap water filtering system and includes a total dissolved solids (TDS) sensor function. Although not shown, the processor 220 is connected to a first electrical resistance sensor inserted into an inlet of a RO membrane of the RO system and a second electrical resistance sensor inserted into a permeate water outlet of the RO membrane. The processor 220 is programmed to compare the electrical resistance of the water going in and the water going out of the RO membrane and to calculate a ratio to get a percent TDS reduction. When the valve member 122 is moved to the opened position and the ratio is more than a predetermined percent TDS reduction limit, the processor 220 is programmed to flash the first LED 212 to indicate that the RO membrane is working properly. When the valve member 122 is moved to the opened position and the ratio is less than the percent TDS reduction limit the processor 220 is programmed to flash the second LED 214 to indicate that the RO membrane needs replacement.

Although not shown, the water quality indicator 200 also includes two switches on the PCB 208 that are connected to the processor and can be set in four different configurations associated with four different predetermined percent TDS reduction limits. For example, a first configuration will set the limit to 75%, a second configuration sets the limit at 80%, a third configuration sets the limit at 85%, and a fourth configuration sets the limit at 90%. The switches are set during manufacturing depending upon the requirements of a filtering system.

According to a further aspect, the water quality indicator 200 includes a total dissolved solids (TDS) sensor function for use with a RO membrane and an elapsed time/usage function for use with a sediment filter or a carbon filter. In this embodiment, the first and the second LEDs will flash successively to indicate that the RO membrane needs replacement when the valve member 122 is moved to the opened position and the TDS ratio is less than the percent TDS reduction limit. Only the second LED 214 will flash to indicate that the filters need replacement when the valve member 122 is moved to the opened position and the filter usage time is equal to or greater than the predetermined usage limit or the filter installment time is equal to or greater than the predetermined filter life limit. Only the first LED 212 will flash when the valve member 122 is moved to the opened position and neither the filters nor the RO membrane need replacement.

The present disclosure, therefore, provides a new and improved faucet assembly having a water quality indicator. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. For example, other devices for providing an indication to a user of the faucet, other than LEDs can be employed. For example, the LEDs can be replaced with liquid crystal display or sound makers, such as electronic buzzers. Accordingly, other embodiments are within the scope of the following claims. In addition, the faucet assembly disclosed herein, and all elements thereof, is contained within the scope of at least one of the following claims. No elements of the presently disclosed faucet assembly are meant to be disclaimed.

What is claimed is:

1. A faucet assembly comprising:
   a base including a water delivery passageway extending between bottom and top ends of the base, a valve assembly bore extending from a sidewall of the base to the water delivery passageway, and a sensor bore extending from the bottom end of the base to the valve assembly bore;

a valve member received in the valve assembly bore of the base for rotation about a longitudinal axis extending between a first end received in the water delivery passageway and a second end extending out of the base, wherein the valve member is adapted to be rotated between a closed position wherein flow through the water delivery passageway is blocked and an opened position wherein flow through the water delivery passageway is permitted;

a magnet secured to the valve member such that, when the valve member is rotated to the opened position, the magnet is aligned with the sensor bore intersecting the valve assembly bore, and when the valve member is rotated to the closed position, the magnet is unaligned with the sensor bore;

a metal rod positioned in the sensor bore; and a Hall effect sensor positioned below the bottom end of the base in alignment with the sensor bore and adapted to switch on when the magnet is aligned with the sensor bore and switch off when the magnet is unaligned with the sensor bore.

2. A faucet assembly according to claim 1, further comprising a processor connected to the Hall effect sensor and programmed to sum a filter usage time equal to time that the Hall effect sensor is switched on.

3. A faucet assembly according to claim 2, further comprising first and second light emitting diodes (LEDs) connected to the processor, wherein the processor is programmed to activate the first LED when the Hall effect sensor is switched on and the filter usage time is less than a predetermined usage limit, and activate the second LED when the Hall effect sensor is switched on and the filter usage time is equal to or greater than the predetermined usage limit.

4. A faucet assembly according to claim 3, wherein the processor is further programmed to sum filter installment time equal to overall time since filter replacement and activate the second LED when the Hall effect sensor is switched on and the filter installment time is equal to or greater than a predetermined filter life limit.

5. A faucet assembly according to claim 3, wherein the processor, the LEDs and the Hall effect sensor are mounted on a printed circuit board (PCB), and the PCB is mounted within a housing secured to the bottom end of the base, and wherein the PCB includes a battery contact and a battery clip for receiving a battery for providing power for the PCB, and wherein the assembly further includes a battery drawer removably received in an opening of the housing and adapted to support a battery between the battery contact and the battery clip.

6. A faucet assembly according to claim 5, wherein the housing also includes a window that receives an LED light tube mounted over the LEDs of the PCB.

7. A faucet assembly according to claim 1, further comprising:

first and second LEDs;

a first electrical resistance sensor for insertion into an inlet of a RO membrane and a second electrical resistance sensor for insertion into a permeate water outlet of the RO membrane; and a processor connected to the Hall effect sensor, the first and second LEDs, and the first and the second electrical resistance sensors, wherein the microprocessor is programmed to, compare the electrical resistance of the water in the inlet and the electrical resistance of the water in the outlet to get a percent total dissolved solids (TDS) reduction, and activate the first LED when the Hall effect sensor is switched on and the percent TDS reduction is greater than a predetermined percent TDS reduction limit, and activate the second LED when the Hall effect sensor is switched on and the percent TDS reduction is less than the predetermined percent TDS reduction limit.

8. A faucet assembly according to claim 7, further comprising two switches connected to the processor that can be set in four different configurations associated with four different predetermined percent TDS reduction limits.

9. A faucet assembly comprising:

a base defining a water delivery passageway; a valve member adapted to be moved between a closed position wherein flow through the water delivery passageway is blocked and an opened position wherein flow through the water delivery passageway is permitted;

a sensor housing secured to a bottom end of the base and including an opening;

a printed circuit board (PCB) secured within the sensor housing and having mounted thereon a battery contact, a battery clip, and a processor, wherein the processor is electrically connected to the battery contact and the battery clip; and a battery drawer removably received in the opening of the sensor housing and adapted to support a battery between the battery contact and the battery clip when the battery drawer and the battery are inserted into the opening of the sensor housing;

first and second light emitting diodes (LEDs) mounted on the PCB and operatively connected to the processor, wherein the sensor housing also includes a window that receives an LED light tube mounted over the LEDs of the PCB;

a metal rod extending from the valve member, through the base, into the sensor housing;

a magnet secured to the valve member such that, when the valve member is rotated to the opened position, the magnet is aligned with the metal rod, and when the valve member is rotated to the closed position, the magnet is unaligned with the metal rod; and a Hall effect sensor mounted on the PCB below the metal rod and connected to the processor, wherein the Hall effect sensor is adapted to switch on when the magnet is aligned with the metal and switch off when the magnet is unaligned with the metal rod;

wherein the processor is programmed to activate the LEDs only when the Hall effect sensor is switched on.

10. A faucet assembly according to claim 9, wherein the processor is programmed to sum a filter usage time equal to time that the Hall effect sensor is switched on, activate the first LED when the Hall effect sensor is switched on and the filter usage time is less than a predetermined usage limit, and activate the second LED when the Hall effect sensor is switched on and the filter usage time is equal to or greater than the predetermined usage limit.

11. A faucet assembly according to claim 9, wherein the processor is programmed to sum filter installment time equal to overall time since filter replacement, activate the first LED when the Hall effect sensor is switched on and the filter installment time is less than a predetermined filter life limit, and activate the second LED when the Hall effect sensor is switched on and the filter installment time is equal to or greater than a predetermined filter life limit.

* * * * *